United States Patent
Miyahara

(10) Patent No.: US 9,488,342 B2
(45) Date of Patent: Nov. 8, 2016

(54) UNDERWATER LIGHTING DEVICE AND UNDERWATER ELECTRONIC DEVICE

(71) Applicant: ELM Inc., Kagoshima (JP)

(72) Inventor: Takakazu Miyahara, Kagoshima (JP)

(73) Assignee: ELM, Inc., Kagoshima (JP)

(*) Notice: Subject to any disclaimer, the term of this patent is extended or adjusted under 35 U.S.C. 154(b) by 232 days.

(21) Appl. No.: 14/404,327

(22) PCT Filed: Sep. 4, 2014

(86) PCT No.: PCT/JP2014/073322
§ 371 (c)(1),
(2) Date: Nov. 26, 2014

(87) PCT Pub. No.: WO2015/045782
PCT Pub. Date: Apr. 2, 2015

(65) Prior Publication Data
US 2016/0265750 A1    Sep. 15, 2016

(30) Foreign Application Priority Data
Sep. 25, 2013    (JP) .................................. 2013-198126

(51) Int. Cl.
*F21V 31/04*    (2006.01)
*F21V 15/01*    (2006.01)
(Continued)

(52) U.S. Cl.
CPC .................. *F21V 15/01* (2013.01); *F21S 9/02* (2013.01); *F21V 23/003* (2013.01); *F21V 23/02* (2013.01);
(Continued)

(58) Field of Classification Search
CPC ...... F21V 31/00; F21V 31/04; F21V 31/005; F21V 23/003
USPC .......................................... 362/101, 477, 96
See application file for complete search history.

(56) References Cited

U.S. PATENT DOCUMENTS 5,221,387 A * 6/1993 Robbins .............. B29C 47/0016
156/244.11
6,074,071 A * 6/2000 Baumberg ............. A01K 63/06
313/506
(Continued)

FOREIGN PATENT DOCUMENTS

CN    101 907 282 A    12/2010
DE    11 62 870 B    2/1964
(Continued)

OTHER PUBLICATIONS

"19-Inchi Rakku-maunto Shouhin—Shuuhen-kiki On Rain Shoppu: Chichuu Maisetsu-gata, Suichuu, Suibotsu, Funsui-you, Gaaden Raito, Wooru WosshaaRaito, RGB Raito (Online Shop of 19-Inch Rack-Mount Products: Underground Buried Light, Underwater Light, Submersible Light, Fountain Light Garden Light Wall Washer Light, and RGB Light", Kabushiki Kaisha Z-Communications, [searched on Sep. 10, 2013], the Internet.
(Continued)

*Primary Examiner* — Karabi Guharay
(74) *Attorney, Agent, or Firm* — Frommer Lawrence & Haug LLP; William S. Frommer

(57) ABSTRACT

Provided is an underwater lighting device and underwater electronic device which are comparatively inexpensive yet durable enough for long-term use. An underwater lighting unit 10, which has an internally provided light source 11 and a gas-tight case 12 with a window 13 for allowing the passage of light from the light source 11, is connected to a land-based unit 30 by a gas-sending tube 40. Air is sent from the land-based unit 30 to the underwater lighting unit 10 to maintain the pressure inside the underwater lighting unit 10 at a value slightly higher than the water pressure at the location. A power line for supplying power to the underwater lighting unit 10 and a signal line for controlling the emission of their light are installed in the gas-sending tube 40. Even if the gas-tight state of one underwater lighting unit 10 is broken, water cannot enter the underwater lighting unit 10. Furthermore, the thereby generated bubbles help users locate the underwater lighting unit 10 in which the gas-tight state has been broken. If a plurality of underwater lighting units 10 are provided, they should preferably be connected in the form of a loop or matrix to the land-based unit 30.

13 Claims, 5 Drawing Sheets

(51) Int. Cl.
| | |
|---|---|
| *F21V 31/00* | (2006.01) |
| *H05B 33/08* | (2006.01) |
| *F21V 23/00* | (2015.01) |
| *F21S 9/02* | (2006.01) |
| *F21V 23/02* | (2006.01) |
| *H04N 5/225* | (2006.01) |
| *G01L 19/12* | (2006.01) |
| *F21Y 101/02* | (2006.01) |

(52) U.S. Cl.
CPC ............. *F21V 31/005* (2013.01); *F21V 31/04* (2013.01); *G01L 19/12* (2013.01); *H04N 5/2252* (2013.01); *H05B 33/0845* (2013.01); *H05B 33/0857* (2013.01); *F21Y 2101/02* (2013.01)

(56) References Cited

U.S. PATENT DOCUMENTS

| | | | |
|---|---|---|---|
| 6,798,154 B1 * | 9/2004 | Sullivan | F21S 8/00 315/158 |
| 8,444,283 B1 | 5/2013 | Miller et al. | |

FOREIGN PATENT DOCUMENTS

| | | |
|---|---|---|
| ES | 1 089 931 U | 9/2013 |
| JP | U 49-062675 | 6/1974 |
| JP | U 51-013683 | 1/1976 |
| JP | U 55-118401 | 8/1980 |
| JP | 05-312947 | 11/1993 |
| JP | 2007-280686 | 10/2007 |
| JP | 2013-051137 | 3/2013 |
| KR | 2009 0020436 A | 2/2009 |
| WO | WO 02/12787 A1 | 2/2002 |

OTHER PUBLICATIONS

Korean Office Action dated Apr. 29, 2016 (and English translation).
Office Action issued in corresponding Japanese application No. 2014-561214 mailed Aug. 11, 2015.
Korean Office Action dated Oct. 21, 2015 (in corresponding Korean patentapplication No. 10-2014-7033561.2.
Extended European Search Reportdated Oct. 29, 2015 (in corresponding European patent application No. 14801902.9.4).

* cited by examiner

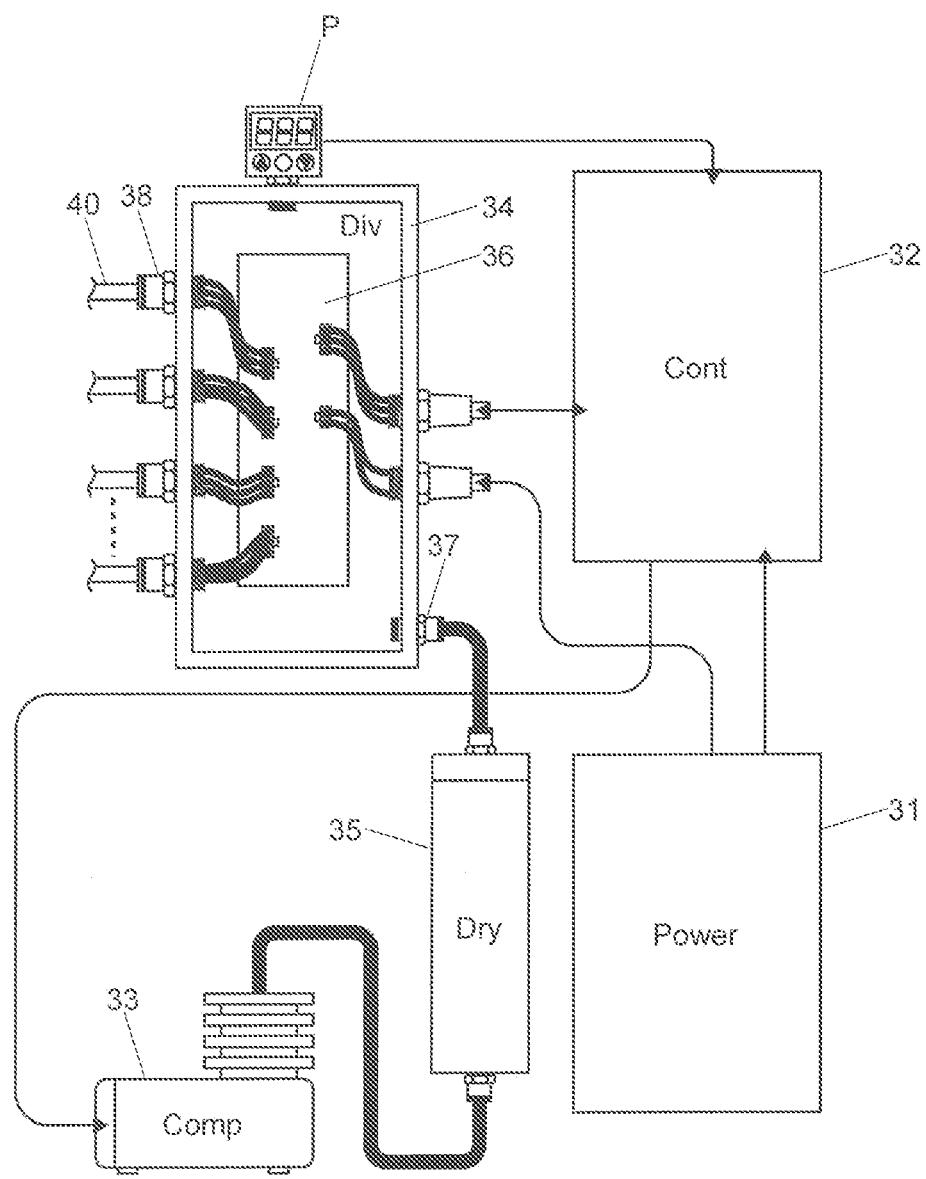

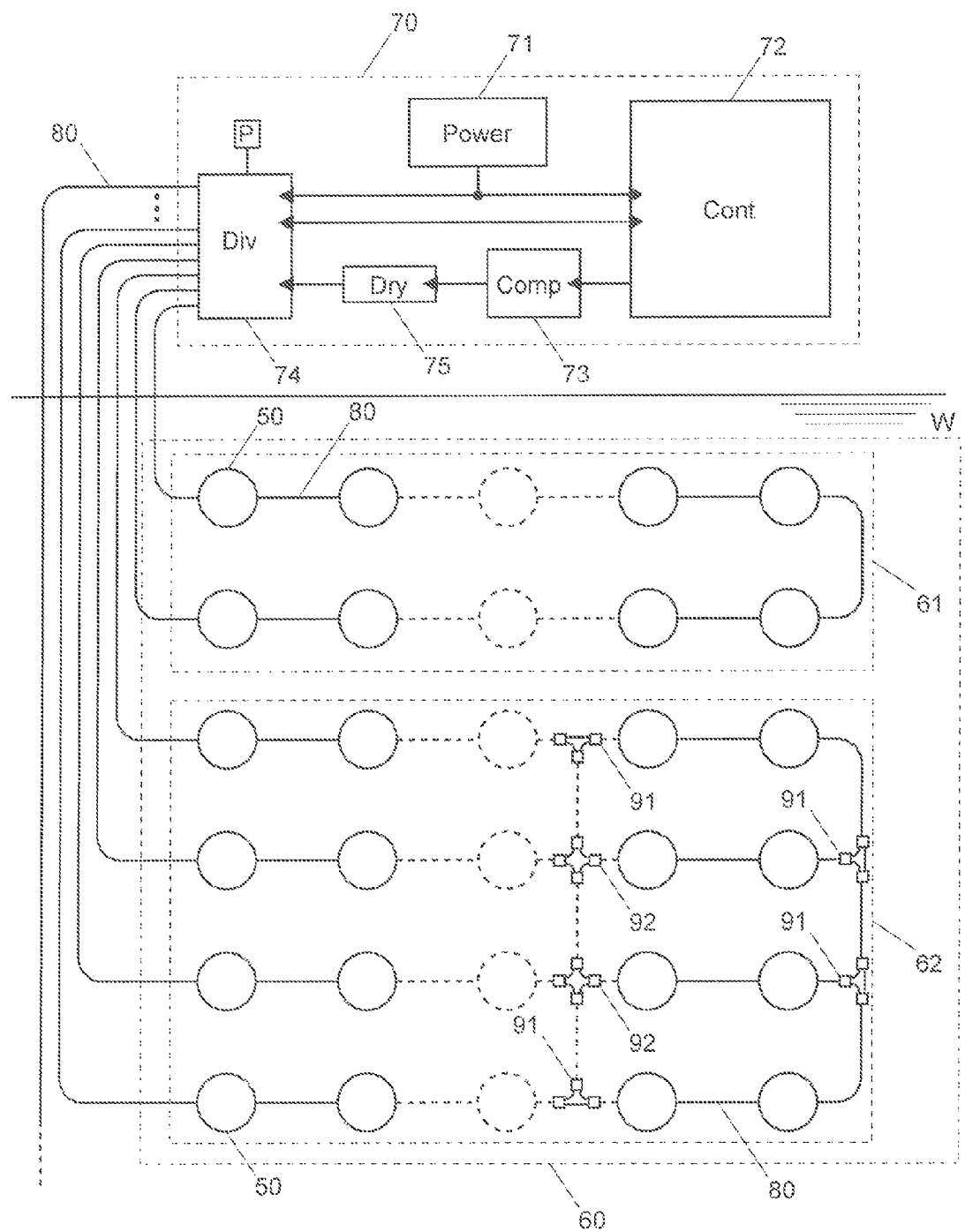

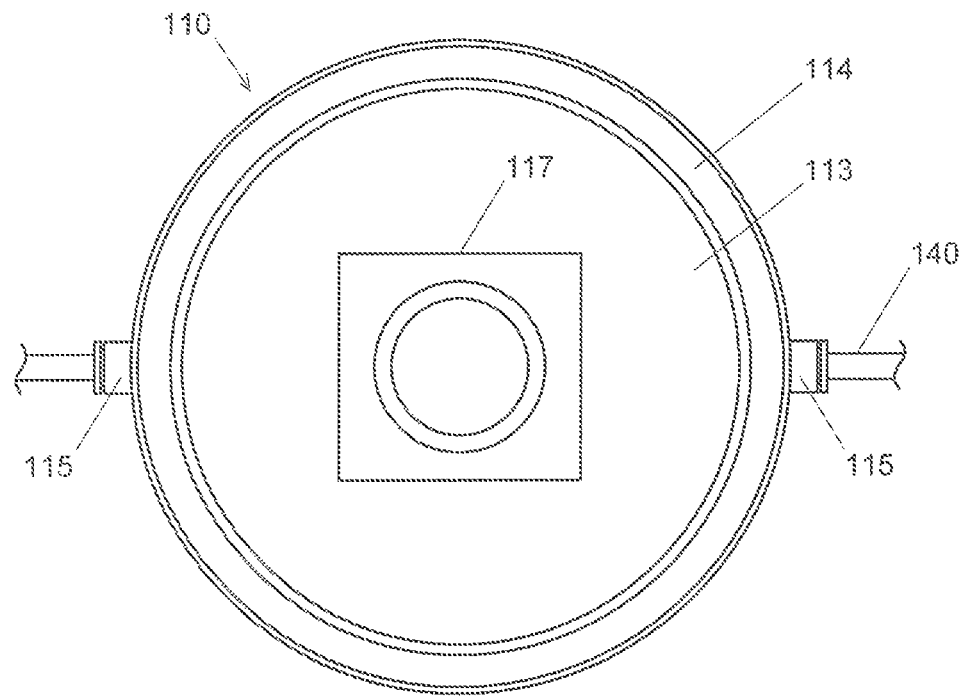
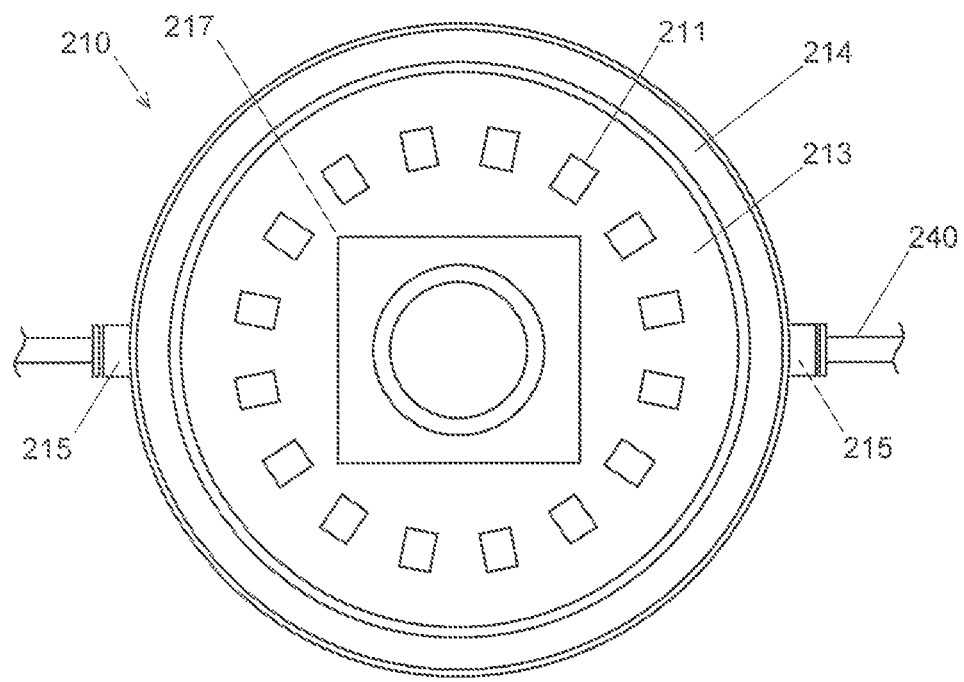

UNDERWATER LIGHTING DEVICE AND UNDERWATER ELECTRONIC DEVICE

TECHNICAL FIELD

The present invention relates to a lighting device and an electronic device which can be placed under water.

BACKGROUND ART

Various kinds of submersible lighting devices which can be placed under water have conventionally been devised for casting light from under water to a space above the water surface or for illuminating natural or artificial objects under water. One conventional lighting device has a lighting system which is divided into a plurality of lighting units. Those lighting units can be arranged in various forms, and each lighting unit can be independently controlled so as to emit light with different shades of color and levels of brightness (Non Patent Literature 1).

CITATION LIST

Non Patent Literature

Non Patent Literature 1: "19-Inchi Rakku-maunto Shouhin—Shuuhen-kiki On Rain Shoppu: Chichuu Maisetsu-gata, Suichuu, Suibotsu, Funsui-you, Gaaden Raito, Wooru Wosshaa Raito, RGB Raito (Online Shop of 19-Inch Rack-Mount Products: Underground Buried Light, Underwater Light, Submersible Light, Fountain Light, Garden Light, Wall Washer Light, and RGB Light", Kabushiki Kaisha Z-Communications, [searched on Sep. 10, 2013], the Internet

SUMMARY OF INVENTION

Technical Problem

To use such a lighting device under water for a long period of time, its container must be highly water-tight to prevent water from entering and damaging the light source or electric systems. Meanwhile, any lighting device needs to have at least a portion of its container made of a transparent glass or resin cover to allow the passage of light. Attempting to ensure high water-tightness at the joining portion between the transparent part and a metallic or hard-resin casing used for ensuring sufficient physical strength makes the device extremely expensive. Therefore, this type of lighting device has been unsuitable in such an application where a large number of units are installed over the entire area of a pond or pool. Similar problems also arise in the case where an electronic unit containing a camera or other electronics is used underwater.

The problem to be solved by the present invention is to provide an underwater lighting device and underwater electronic device which are comparatively inexpensive yet durable enough for long-term use.

Solution to Problem

An underwater lighting device according to the present invention aimed at solving the previously described problem includes:

a) an underwater lighting unit having an internally provided light source and a gas-tight case with a window for allowing the passage of light from the light source;

b) a gas-sending tube to be connected to an opening provided in the gas-tight case; and c) a land-based gas-supply system for sending gas into the gas-sending tube.

In the underwater lighting device according to the present invention, the light source may be supplied with power from a battery (primary or secondary battery) provided inside the underwater lighting unit. However, it is more preferable to supply the power from a land-based power source. In this case, the line for supplying the power may be provided separately from the gas-sending tube or be passed through the gas-sending tube.

In the underwater lighting device according to the present invention, it is preferable to connect a signal line for transmitting a signal for controlling an emission of light from the light source (such as blinking, emission intensity or color of light). If the aforementioned power supply line is provided, the signal line should preferably be laid with or bundled with the power supply line. If the power supply line is passed through the gas-sending tube in the aforementioned manner, the signal line should also be passed through the same tube.

In the case where the signal line and the power line are passed through the gas-sending tube, it is possible to transmit the signal in a superposed form on the power line instead of separately passing the two lines. Naturally, the emission control signal can also be superposed on the power line in the case of installing the power line separately from the gas-sending tube.

Furthermore, it is preferable to provide the gas-supply system with a pressure sensor, a controller and a pump, and to configure the controller so as to control the operation of energizing and deactivating the pump based on a detection result obtained by the pressure sensor. The "pressure sensor" in this context does not only include a sensor for measuring a pressure value (this type of sensor is hereinafter called the "pressure value sensor") but also a sensor which produces a signal in every predetermined range of pressure as well as a pressure switch which turns ON or OFF every time the pressure reaches a predetermined value.

It is also possible to provide the gas-supply system with a gas divider in such a manner that the gas is sent through the gas divider to a plurality of underwater lighting units in parallel.

Each of the aforementioned plurality of underwater lighting units arranged parallel to each other may be a plurality of underwater lighting units serially interconnected by the gas-sending tube.

The plurality of underwater lighting units may be serially connected by the gas-sending tube and further connected to the gas-supply system (or the gas divider) to form a loop-like shape.

The plurality of underwater lighting units may be connected to the gas-supply system (or the gas divider) by a plurality of gas-sending tubes configured like a network (or matrix).

The controller of the gas-supply system should preferably be configured so as to generate an alarm when the rate of decrease in the pressure detected by the pressure value sensor is higher than a predetermined rate. The reason for this is because a sudden decrease in the pressure is most likely to be due to an occurrence of abnormal leakage of gas. As the alarm, a sound and/or light may be generated on the spot, or an e-mail or the like may be sent to a predetermined external terminal (e.g. mobile phone or personal computer).

If the pressure sensor is a pressure switch which turns ON or OFF every time the pressure reaches a predetermined value, or if a similar ON/OFF control is performed using a pressure value sensor, it is preferable to configure the controller so as to generate an alarm when the situation in which the pressure is equal to or lower than a predetermined value continues for a predetermined period of time or longer (i.e. when the pump is operating for a predetermined period of time or longer). This is also because the situation is most likely to be due to an occurrence of abnormal leakage of gas.

While a similar control is being performed, when the pressure is restored to a value equal to or higher than the predetermined value by the pumping operation, the pump is deactivated. After that, if the pressure once more decreases to a value equal to or lower than the predetermined value within a predetermined period of time and causes the pump to be energized once more, it is also most likely to be due to an occurrence of an abnormal leakage of gas. Therefore, in such a case, the controller should also generate an alarm.

The present invention can also be used to solve the previously described problem for the aforementioned electronic unit containing a camera or other electronics. That is to say, an underwater electronic device according to the present invention includes:

a) an underwater electronic unit having a gas-tight case with a window for allowing the passage of light;

b) a gas-sending tube to be connected to an opening provided in the gas-tight case; and c) a land-based gas-supply system for sending gas into the gas-sending tube.

The underwater electronic device according to the present invention can be transformed into the various previously described modes of the underwater lighting device (with various forms relating to the power supply, signal line, pump control, gas-supply system, gas-sending-tube configuration and/or alarm generation) by merely replacing its underwater electronic unit with an underwater lighting unit of the underwater lighting device.

Advantageous Effects of the Invention

In the underwater lighting device or underwater electronic device according to the present invention, by sending gas into the gas-tight case of the underwater lighting unit (or the underwater electronic unit; the same shall apply hereafter), the pressure inside the gas-tight case can be maintained at higher values than the (water) pressure in the water in which the underwater lighting unit is placed. By this operation, even if the gas-tight state of the case is broken, the high gas pressure prevents water from entering the underwater lighting unit, whereby the light source, its circuit and other elements inside the case are prevented from being damaged. Furthermore, since the difference between the internal and external pressures is decreased due to the increase in the inner pressure, it is possible to use, as the gas-tight case, a simple waterproof case made of metal, plastic or other materials with a waterproof level of IP67 or so.

The use of the system for supplying power from land to the light source through the line passed through this gas-supplying tube or installed separately from the gas-sending tube enables the device to be continuously used for a long period of time.

In the case where the gas-supply system (or gas divider) and a plurality of underwater lighting units are connected in the form of a loop or matrix, each underwater lighting unit is supplied with gas through two gas-sending tubes. As a result, even if a gas leakage occurs at one location in the gas-sending tubes, each underwater lighting unit is assuredly supplied with gas from at least one of the gas-sending tubes, so that the water cannot enter any underwater lighting unit.

Furthermore, by appropriately generating an alarm according to the detection value of a pressure sensor or similar information, users can detect in early stages a breakage or similar problem of the underwater lighting unit or gas-sending tube and take appropriate measures.

BRIEF DESCRIPTION OF DRAWINGS

FIG. 4 is a schematic configuration diagram of a land-based unit in the same embodiment.

FIG. 5 is a schematic configuration diagram of a multi-series underwater lighting system as the second embodiment of the present invention.

FIGS. 6A and 6B are plan views of underwater electronic units in another embodiment of the present invention, where FIG. 6A is a unit which only includes a camera and FIG. 6B is a unit which includes a camera and a light source.

DESCRIPTION OF EMBODIMENTS

First Embodiment

Figure 1:
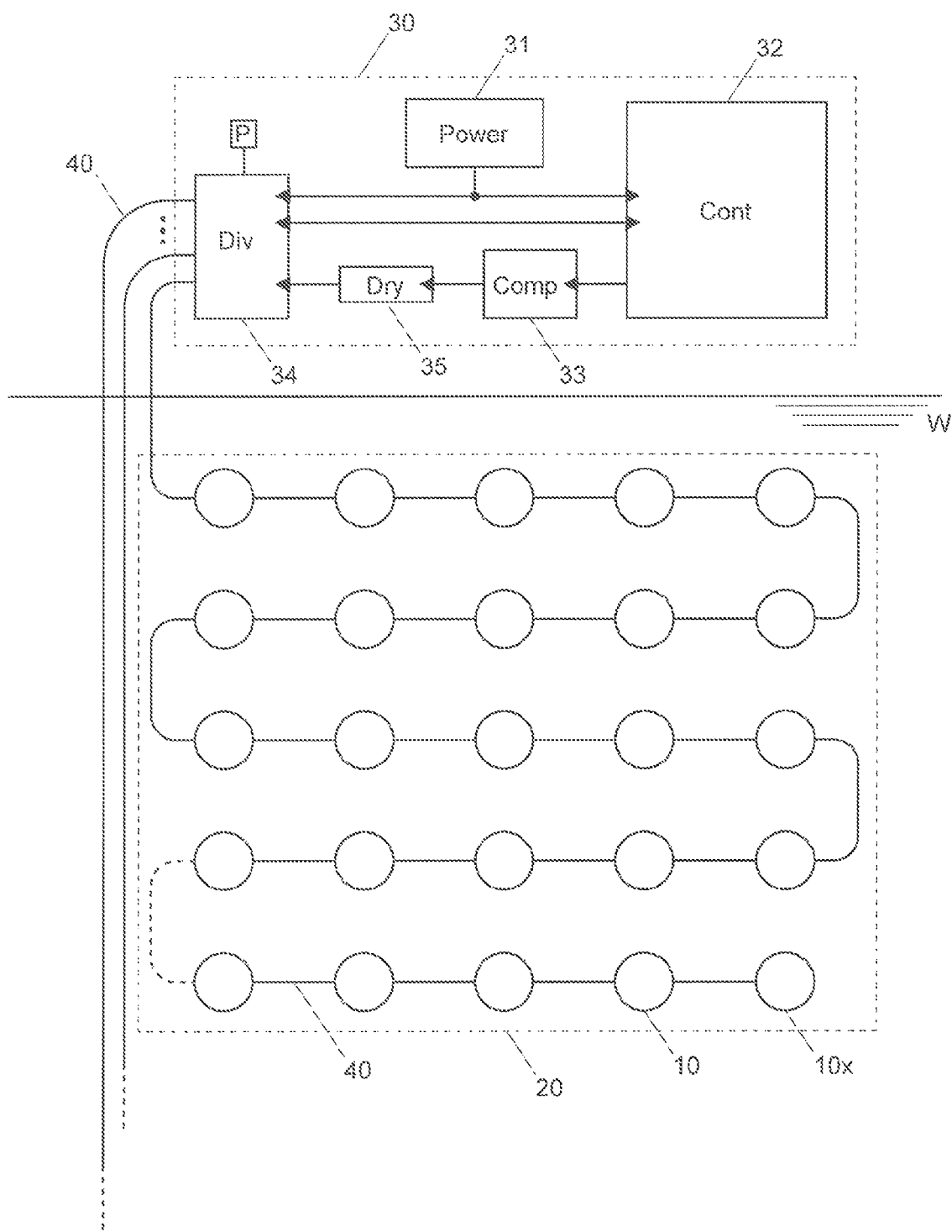
FIG. 1 is a schematic configuration diagram of a multi-series underwater lighting system as the first embodiment of the present invention.

A multi-series underwater lighting system, which is the first embodiment of the present invention, is hereinafter described with reference to FIGS. 1-4. FIG. 1 is a schematic configuration diagram of the entire system. The present system roughly consists of a land-based unit 30 to be placed on land and a set of underwater equipment to be placed under water W. The underwater equipment includes a large number of underwater lighting units 10, which are divided into a plurality of series each of which consists of a predetermined number of sequentially connected underwater lighting units. In the case of FIG. 1, the large number of underwater lighting units 10 inside the broken-line frame are serially connected as one series 20 by a gas-sending tube 40 (which will be described later). In the example of FIG. 1, more such series are connected parallel with the series 20.

Figure 2A:
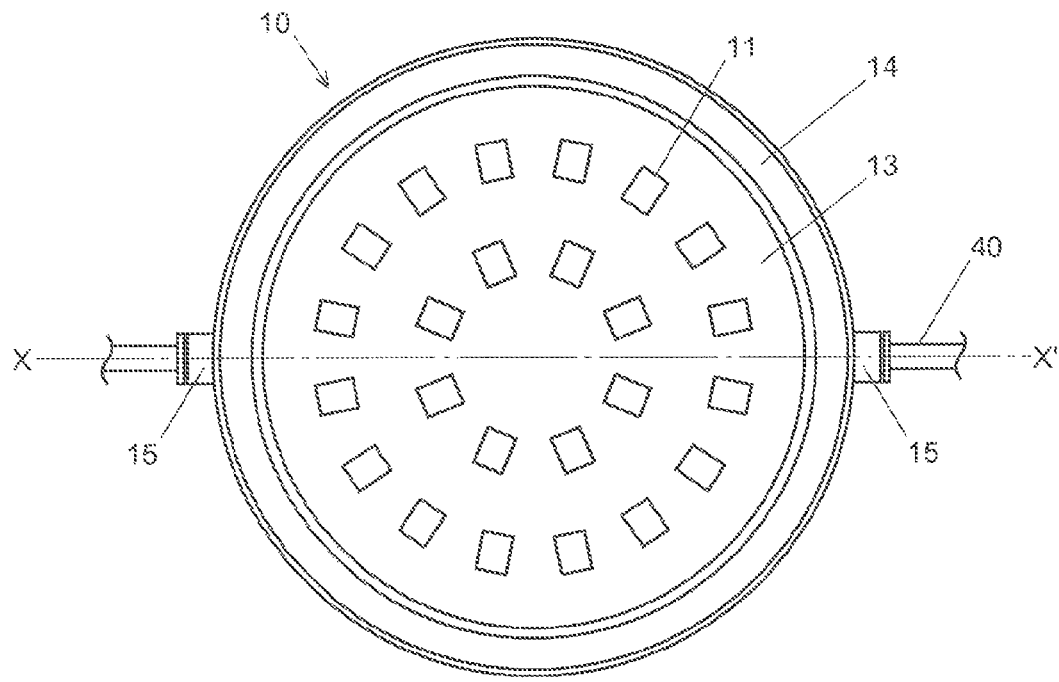
FIG. 2A is a plan view of the underwater lighting unit in the same embodiment.
Figure 2B:
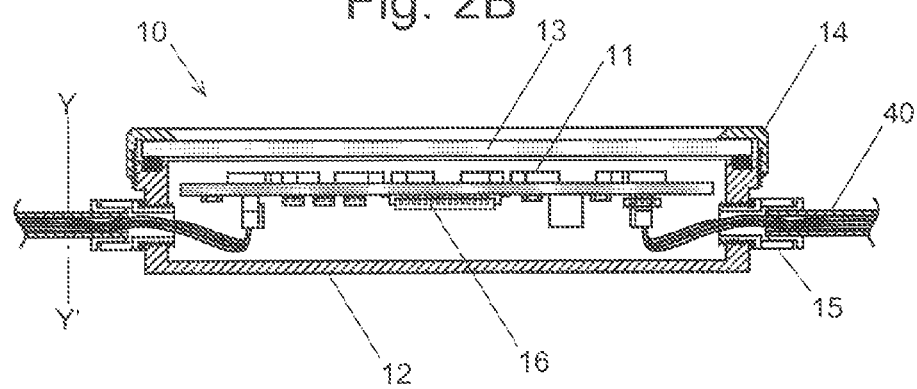
FIG. 2B is a sectional view at line X-X'.

Initially, the underwater lighting units 10 are described in detail. FIG. 2A is a plan view of one underwater lighting unit 10, and FIG. 2B is a sectional view at line X-X' in FIG. 2A. In this example, 24 full-color LED elements 11 are used as the light source. The number of LED elements 11 can be arbitrarily chosen. It is also possible to use LED elements in which RGB colors are independently produced. An incandescent bulb or fluorescent lamp may also be used.

The underwater lighting unit 10 in the present embodiment has a roughly disc-shaped metallic case 12 having an upper opening in which a glass plate 13 is placed via an O-ring. The glass plate 13 is pressed onto the case 12 by a threaded window cover 14 to create a gas-tight structure. A simple waterproof case made of metal, plastic or other materials with a waterproof level of IP67 or so can be used as the case 12, since it does not need to be extremely gas-tight (or water-tight). A case which is entirely or partially made of resin or similar material may possibly float due to buoyancy when air is introduced inside in a manner which will be described later. In such a case, the case may be partially made of metal or a weight may be attached to its bottom or circumferential side.

A small side opening is formed in each of the two sides of the case 12. A pipe joint 15 is attached to each opening. The underwater lighting unit 10x located at the end of the series has the pipe joint 15 attached to only one side opening (on the side connected to the previous underwater lighting unit 10); the pipe joint 15 on the other side opening (at the extremity of the series) is hermetically closed by a hollow screw and an O-ring. A gas-sending tube 40 made of rubber or plastic is fitted into each pipe joint 15. By this gas-sending tube 40, each underwater lighting unit 10 is connected to the neighboring underwater lighting unit 10 or to the divider 34 in the land-base unit 30 (which will be described later).

Figure 3:
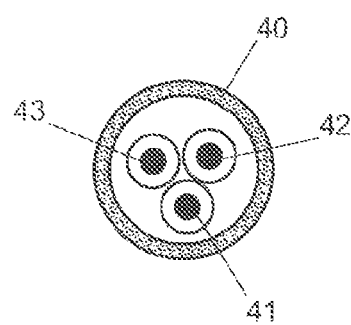
FIG. 3 is a sectional view (at line Y-Y' in FIG. 2B) of the gas-sending tube in the same embodiment.

As shown in FIG. 3, a power line 41 for supplying power to be used in each underwater lighting unit 10, a signal line 42 for transmitting control signals for controlling the blinking, emission intensity and color of the light generated by the LED elements 11, and a common ground line 43, are passed through the gas-sending tube 40 so as to send electric power and control signals to the plurality of underwater lighting units 10 belonging to one series 20. There are various other wiring forms adoptable, such as a two-line system with the signals superposed on the power line 41 or a four-line system including two separate signal lines for sending and receiving signals, respectively. In the case where the signals are superposed on and transmitted through the power line 41, a signal superposition circuit should be added to a divider circuit 36 (which will be described later).

FIG. 4 shows the configuration of the land-based unit 30. The land-based unit 30 has a power supply device (Power) 31, a control circuit (Cont) 32, a compressor (Comp) 33, a divider (Div) 34 and an air drier (Dry) 35. The power supply device 31 supplies an electric power to all the underwater lighting units 10 and to each component in the land-based unit 30. The power may be obtained from either a commercial power supply, a private electric generator, or a large-scale electrical storage device.

The control circuit 32 produces signals for controlling the blinking, emission intensity and emission color of the LED elements 11 in the underwater lighting units 10. Those signals are sent to the underwater lighting units 10 via the divider circuit 36 (which will be described later).

The compressor 33 begins or discontinues its operation under the control of the control circuit 32 so as to supply a required amount of compressed air to the divider 34 when necessary.

Normally, the temperature inside the underwater lighting unit 10 placed under water is lower than the air temperature on land. Therefore, if the air on land is directly sent into the underwater lighting unit 10, dew condensation may possibly occur inside the underwater lighting unit 10 and damage the LED elements 11, the circuit 16 (FIG. 2B) and other components. Accordingly, a dehumidification system for removing moisture (humidity) from the air on land should be provided between the compressor 33 and the divider 34 (in the example of FIG. 4, the air dryer 35 using silica gel is provided).

The divider 34 is a hermetically sealed container having a predetermined capacity for receiving air supplied from the compressor 33 and for equally sending the air to each series 20 through the gas-sending tube 40. The divider 34 is provided with the same number of pipe joints 38 as the maximum required number of series. The joint for receiving air from the compressor 33 is provided with a check valve 37. The divider 34 is provided with a pressure sensor P. The signal generated by the pressure sensor P is sent to the control circuit 32. If air leakage occurs in one of the underwater lighting units 10, the air leakage will appear as a decrease in the air pressure inside the underwater lighting unit 10, which in turn will appear as a decrease in the air pressure inside the divider 34, to be eventually detected by the pressure sensor P. Upon detecting this, the controller 32 energizes the compressor 33 to send air through the divider 34 to all the underwater lighting units 10. This air is intensively distributed to the underwater lighting unit 10 in which the pressure has decreased due to the air leakage, whereby the decrease in the pressure in this unit is compensated for.

More specifically, the control circuit 32 energizes the pump in the compressor 33 when the detection value Pm of the pressure sensor P has become lower than a predetermined value P1, and deactivates the pump when the detection value Pm has become higher than another predetermined value P2 (>P1). P1 should be set at a value slightly higher than the water pressure Pa in the water in which the underwater lighting units 10 are placed.

In place of the pressure sensor P for continuously measuring the pressure value, it is possible to use a pressure switch which produces three different signals according to whether the pressure value is (1) equal to or lower than the predetermined value P1, (2) between P1 and P2, or (3) equal to or higher than P2. A two-value switch which turns on and off according to the pressure value may also be used. For example, in the case where a pressure switch which opens when the pressure value has exceeded the predetermined value P1 is used, the pump is energized when the pressure switch turns OFF and is deactivated when the pressure switch turns ON.

The control circuit 32 may also be configured so as to generate an alarm according to the state and/or transition of the pressure sensor P or the pressure switch in addition to performing the control of the pump (compressor 33). For example, the alarm should preferably be generated when the rate of decrease in the detection value Pm of the pressure sensor P has exceeded a predetermined value S, since this situation may be the result of an abnormal leakage of air. The alarm may be generated on the spot by the control circuit 32 using sound and/or light. Additionally, a notifying e-mail or the like may be sent to a remote device (e.g. mobile phone or personal computer) via private lines, mobile phone networks, the Internet or other communication lines. Alternatively, or additionally, an alarm may also be generated when the pressure value has continuously remained at values equal to or lower than a first predetermined value P1 for a period of time equal to or longer than a predetermined length (i.e. when the operation time of the pump has exceeded a predetermined length of time). A similar measure can also be taken in the case where the pressure switch is a two-value switch.

The divider 34 also contains a power division circuit for distributing the power from the power supply device 31 to the row of underwater lighting units 10 included in each series 20 as well as a signal division circuit for distributing the previously described control signals to those units. The electric power from the power supply device 31 and the control signals from the control circuit 32 are divided into powers and signals for the plurality of series 20 by the divider circuit 36 which includes the power division circuit and the control signal division circuit, to be delivered to each underwater lighting unit 10 through the lines 41, 42 and 43 installed in the gas-sending tubes 40, as already explained. The DMX or similar communication protocol can be used for the transmission of emission control signals to the underwater lighting units 10. As already noted, in the case where the control signals are superposed on and transmitted through the power line to the underwater lighting units 10, a signal superposition circuit and a signal separation circuit should be added to the divider circuit 36 and each underwater lighting unit 10, respectively.

Thus, in the underwater lighting units 10 according to the present embodiment, since all the underwater lighting units 10 are serially interconnected by the gas-sending tubes 40 in each series 20, the air pressure inside the case 12 of each underwater lighting unit 10 can be arbitrarily set by supplying air from the land-based divider 34. The air supply pressure is controlled so as to be slightly higher than the calculated or measured pressure which acts on the underwater lighting unit 10 placed at the deepest level (i.e. under the highest water pressure). Therefore, even if the gas-tight state of one of the underwater lighting units 10 is broken, it merely results in a leakage of air from the underwater lighting unit 10 to the outside; the inner space of this underwater lighting unit 10 is assuredly protected from any entry of water. Furthermore, when the gas-tight state of one underwater lighting unit 10 is broken, the air leaking from this underwater lighting unit 10 turns into bubbles, which help users locate the underwater lighting unit 10 in which the leakage has occurred.

A pressure sensor may also be provided in each underwater lighting unit 10 as well as in the divider 34 of the land-based unit 30. This configuration makes it possible to detect breakage of the gas-tight state of each underwater lighting unit 10 in earlier stages and energize the compressor 33 more promptly.

If the underwater lighting units 10 are placed at a depth of 10 m or less, the pressure of the air to be supplied into those units only needs to be 1 kg/cm$^2$ or less; besides, the amount of air supply can be so low as to merely compensate for the leakage. Therefore, the compressor 33 may be a low-capacity type. Accordingly, it does not need to be a common piston type; there are many other choices, such as a tubular pump or bellows type.

When the compressor 33 is energized and the necessary (trace) amount of air is supplied to the underwater lighting unit 10 in question, the pressure in this underwater lighting unit 10 is immediately restored to a proper level. This is detected with the pressure sensor in the underwater lighting unit 10 or the pressure sensor P in the divider 34, and the compressor 33 is deactivated. Thus, unnecessary consumption of the electric power is avoided.

In the previously described embodiment, the land-based unit 30 is configured to independently perform necessary functions. It is also possible to connect its control circuit 32 to a personal computer or similar controller directly or via communication lines, and run a software program on the computer to temporally control the amount and/or color of luminescence of each underwater lighting unit 10. In this case, the lighting can be more freely controlled by appropriately programming the computer.

As shown in the previous embodiment, the present invention can suitably be applied in a system having a plurality of underwater lighting units 10. However, the present invention itself does not always require the use of a plurality of underwater lighting units 10; it can naturally be carried out for a single underwater lighting unit 10.

Second Embodiment

A multi-series underwater lighting system as the second embodiment of the present invention is shown in FIG. 5. Each component in FIG. 5 which is denoted by a number equal to 40 plus a number given to a component in the first embodiment shown in FIG. 1 is identical to this component in the first embodiment, and therefore, will not be hereinafter described.

In the present embodiment, each series 60 composed of a plurality of underwater lighting units 50 consists of a loop-like underwater lighting unit series 61 and a matrix-like underwater lighting unit series 62. In the loop-like series 61, a plurality of underwater lighting units 50 are connected to the divider 74 by the gas-sending tubes 80 in the form of a loop. In the matrix-like series 62, the gas-sending tubes 80 and the underwater lighting units 50 are connected to the divider 74 in the form of a loop, and additionally, some of the gas-sending tubes 80 are interconnected via T-shaped air joints 91 and cross-shaped air joints 92 so as to form a network (matrix) of gas-sending tubes 80.

In the multi-series underwater lighting system of the present embodiment, each underwater lighting unit 50 is connected with two gas-sending tubes 80 and supplied with air from both gas-sending tubes 80, regardless of whether it is in the loop-like series 61 or the matrix-like series 62. Therefore, even if air leakage occurs in one gas-sending tube 80, the air supply from the other gas-sending tube 80 continues, whereby water is prevented from entering the underwater lighting unit 50.

The underwater lighting unit 10 or 50 in the previous embodiments can be replaced with an underwater electronic unit containing a camera (which may be either a still camera or movie camera). It may also be replaced by an underwater electronic unit having a camera and a lighting device. FIGS. 6A and 6B respectively show plan views of underwater electronic units in an underwater electronic device as one embodiment of the present invention corresponding to those cases. In these figures, each component denoted by a number whose last two digits are the same as a number given to a component in the underwater lighting unit 10 shown in FIG. 2A is identical to this component in the underwater lighting unit 10, and therefore, will not be hereinafter described.

The underwater electronic unit 110 shown in FIG. 6A has a camera 117 placed in it. For example, this underwater electronic unit 110 can be used for taking underwater pictures of farmed fish.

The underwater electronic unit 210 shown in FIG. 6B has, in addition to the camera 217, a number of LED elements 211 for illuminating the target of imaging. This underwater electronic unit 210 allows taking pictures under water by night or at a depth where no light can reach.

REFERENCE SIGNS LIST

10, 10x, 50 . . . Underwater Lighting Unit
11, 211 . . . LED Element
12 . . . Case
13, 113, 213 . . . Glass Plate
14, 114, 214 . . . Window Cover
15, 115, 215 . . . Pipe Joint
16 . . . Circuit (inside the Underwater Lighting Unit)
20, 60, 61, 62 . . . Underwater Lighting Unit Series
30, 70 . . . Land-Based Unit
31, 71 . . . Power Supply Device
32, 72 . . . Control Circuit
33, 73 . . . Compressor
34, 74 . . . Divider
35, 75 . . . Air Drier
36 . . . Divider Circuit
38 . . . Pipe Joint 40, 80, 140, 240 . . . Gas-sending Tube
41 . . . Power Line
42 . . . Signal Line
43 . . . Ground Line
110, 210 . . . Underwater Electronic Unit
117, 217 . . . Camera
P . . . Pressure Sensor

The invention claimed is:

1. An underwater lighting device, comprising:
    a) a plurality of underwater lighting units having an internally provided light source and a gas-tight case with a window for allowing passage of light from the light source;
    b) a gas-sending tube to be connected to an opening provided in the gas-tight case; and
    c) a gas-supply system for sending gas into the plurality of underwater lighting units, which are connected by the gas-sending tubes in a loop-like form or a matrix-like form, through a gas divider and the gas-sending tubes.

2. The underwater lighting device according to claim 1, wherein, further, a line for supplying electric power from a power source to the light source is passed through the gas-sending tube.

3. The underwater lighting device according to claim 2, comprising a signal superposition circuit for superposing, on the line passed through the gas-sending tube, the signal for controlling an emission of light of the light source.

4. The underwater lighting device according to claim 1, wherein, further, a line for transmitting a signal for controlling an emission of light of the light source is passed through the gas-sending tube.

5. The underwater lighting device according to claim 1, further comprising a pressure sensor, a controller and a pump in the gas-supply system, the controller being configured so as to control an operation of energizing and deactivating the pump based on a detection result obtained by the pressure sensor.

6. The underwater lighting device according to claim 5, wherein the controller generates an alarm in a case where a rate of decrease in a value detected by the pressure sensor is greater than a predetermined value.

7. The underwater lighting device according to claim 6, wherein the controller transmits the alarm to a predetermined external terminal.

8. The underwater lighting device according to claim 5, wherein the controller generates an alarm in a case where the pump is operating for a period of time equal to or longer than a predetermined length of time.

9. The underwater lighting device according to claim 8, wherein the controller transmits the alarm to a predetermined external terminal.

10. The underwater lighting device according to claim 5, wherein the controller generates an alarm in a case where the pump is re-energized within a predetermined period of time after the pump is deactivated.

11. The underwater lighting device according to claim 10, wherein the controller transmits the alarm to a predetermined external terminal.

12. An underwater electronic device, comprising:
    a) a plurality of underwater electronic units having a gas-tight case with a window for allowing passage of light;
    b) a gas-sending tube to be connected to an opening provided in the gas-tight case; and
    c) a gas-supply system for sending gas into the plurality of underwater electronic units, which are connected by the gas-sending tubes in a loop-like form or a matrix-like form, through a gas divider and the gas-sending tubes.

13. The underwater electronic device according to claim 12, comprising a camera inside the underwater electronic unit.

* * * * *